United States Patent [19]
Auch et al.

[11] Patent Number: 4,585,347
[45] Date of Patent: Apr. 29, 1986

[54] ROTATION RATE MEASURING INSTRUMENT

[75] Inventors: Wilfried Auch, Asperg; Eberhard Schlemper, Vaihingen, both of Fed. Rep. of Germany

[73] Assignee: International Standard Electric Corporation, New York, N.Y.

[21] Appl. No.: 562,149

[22] Filed: Dec. 16, 1983

[30] Foreign Application Priority Data

Dec. 18, 1982 [DE] Fed. Rep. of Germany ....... 3247013

[51] Int. Cl.$^4$ ...................... G01B 9/02; G01C 19/64
[52] U.S. Cl. ................................................ 356/350
[58] Field of Search ...................................... 356/350

[56] References Cited

FOREIGN PATENT DOCUMENTS

WO83/01303 10/1981 PTC Int'l Appl. ................. 356/350

Primary Examiner—Vincent P. McGraw
Assistant Examiner—S. A. Turner
Attorney, Agent, or Firm—John T. O'Halloran; Thomas P. O'Hare

[57] ABSTRACT

The rotation rate measuring instrument, in which the phase difference caused by the Sagnac effect is evaluated, contains two optical waveguides (7, 17). From a light beam, two component beams (CW, CCW) are derived which traverse the first optical waveguide (7) in opposite directions. A passive beam splitter (16) connects the first optical waveguide with the second optical waveguide (17) and splits each of the component beams into two further component beams. Of these further component beams, one remains in the first optical waveguide, and the other enters the second optical waveguide, where it propagates in the opposite direction. Evaluation, for which the two component beams are combined after having traversed one or both optical waveguides, takes place on a time-division multiplex basis, such that either the traversal of only one optical waveguide (7) or the traversal of both optical waveguides (7, 17) is taken into account. By comparing the two measurements, additional nonreciprocal phase differences ($\phi_{NR}$) are determined, which can be taken into account during evaluation.

8 Claims, 1 Drawing Figure

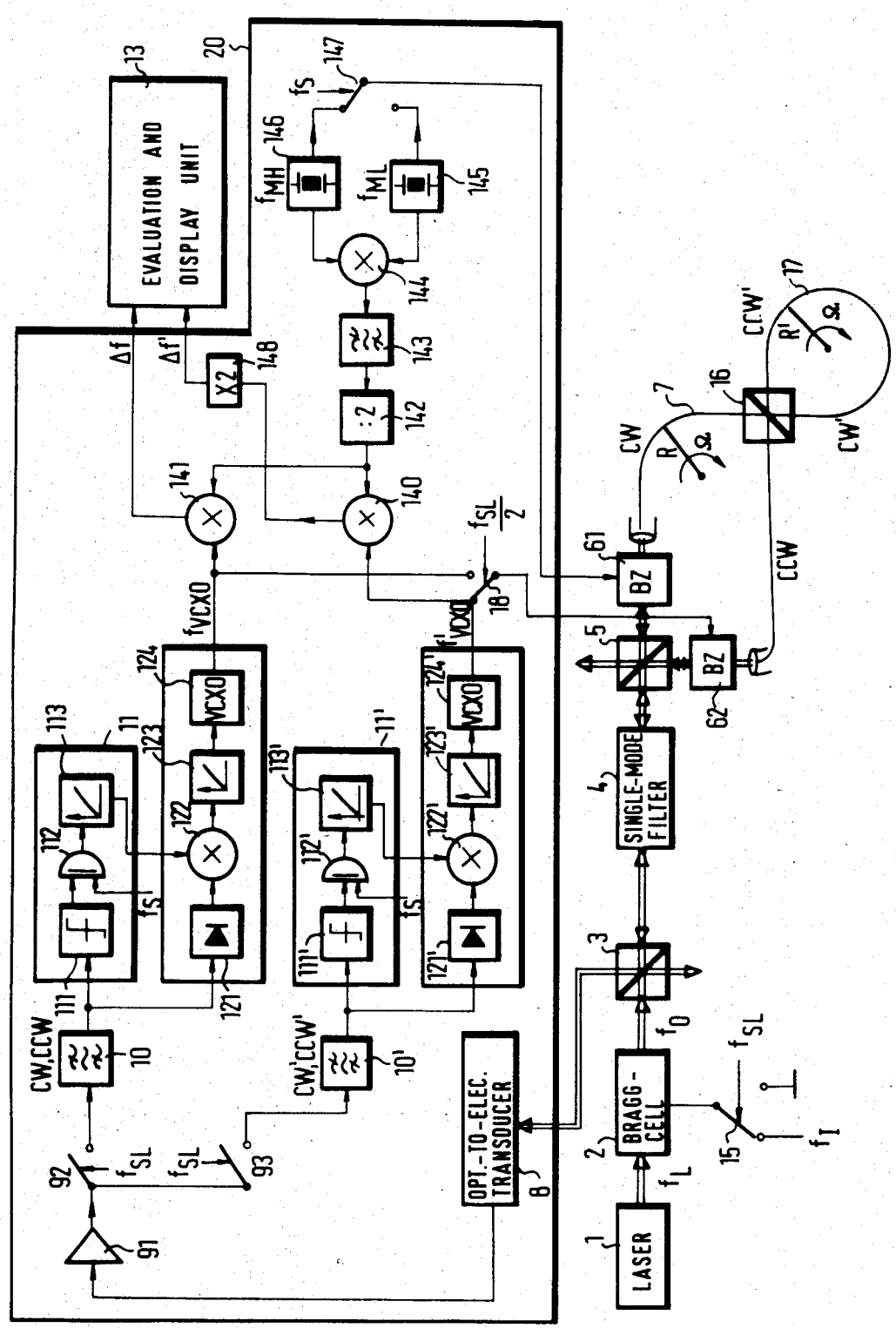

ROTATION RATE MEASURING INSTRUMENT

The present invention relates to a rotation rate measuring instrument. An instrument of this kind is described in German Patent Application No. P 31 36 688.

Measurements have shown that even if the measuring instrument is completely reciprocal in construction, errors are caused by nonreciprocal phase differences between the component beams. These nonreciprocal phase differences are present in addition to the nonreciprocal Sagnac phase difference, from which the rotation rate is determined. The causes of such additional nonreciprocal phase differences are manifold.

If, for example, a modulator is provided between the beam splitter dividing the light beam from the light source into two component beams at each end of the optical waveguide, as is the case in many instruments of this kind, an additional nonreciprocal phase difference is produced just because the two modulators are not located at exactly the same distance from the beam splitter.

German Patent Application No. DE-OS 31 00 898 discloses a solution in which changeover is effected between two coiled optical waveguides. The component beams travel around the two optical waveguides in such a way that Sagnac phase differences with different signs, i.e., $+\phi_s$ and $-\phi_s$, are produced. If the nonreciprocal "interference phase" is designated $\phi_{NR}$, the resulting nonreciprocal phase differences for the two optical waveguides are $\phi_{NR}+\phi_s$ and $\phi_{NR}-\phi_s$, from which the interference phase can be determined in principle. However, this arrangement requires an optical switch for switching between the two optical waveguides. This switching produces an additional phase difference, so that $\phi_{NR}$ is no longer the same for the measurements with the two optical waveguides, but two different interference phases $\phi_{NR1}$ and $\phi_{NR2}$ are obtained.

The object of the invention is to provide a rotation rate measuring instrument in which the additional nonreciprocal interference phase can be determined and taken into account during evaluation.

This object is attained by the means set forth in claim 1. Advantageous features are claimed in the subclaims.

In the novel rotation rate measuring instrument, accuracy is improved. In addition, the direction of rotation can be determined in a particularly simple manner.

An embodiment of the invention will now be explained in more detail with reference to the accompanying drawing, which is a block diagram of the rotation rate measuring instrument.

First, the portion of the instrument which is present in similar form in the instrument disclosed in German Patent Application P 31 36 688 will be described.

A laser 1 produces a coherent light beam of frequency $f_L$, which enters a Bragg cell 2. A signal of frequency $f_I$ is applied to the Bragg cell through a bistable switch 15. In one of the two switch positions, no signal is applied to the Bragg cell. The beam paths and the optical components are so adjusted that the output beam of the Bragg cell 2 strikes a beam splitter 3 only if the Bragg cell 2 is driven with a signal of frequency $f_I$. Changeover of the switch 15 occurs at the frequency $f_{SL}$. As a result, the laser is activated and deactivated for the subsequent beam path at the frequency $f_{SL}$.

As the Bragg cell is driven with a signal of frequency $f_I$, the frequency $f_L$ of the light beam produced by the laser is shifted to the frequency $f_O=f_L+f_I$. Any light that may be reflected back to the laser thus has a frequency different from that of the light produced by the laser, so that any interference with the operation of the laser is avoided.

After passing through the Bragg cell 2, the light beam travels through a first beam splitter 3 and a single-mode filter 4 to a second beam splitter 5. In the second beam splitter 5, the light beam is divided into two component beams CW and CCW, each of which is coupled into one end of a closed light path 7, which they traverse clockwise, CW, and counterclockwise, CCW, respectively.

Before entering the closed light path 7, the two component beams CW and CCW are shifted in frequency by two additional Bragg cells 61 and 62, respectively.

The Bragg cell 61 is driven alternately at the frequencies $f_{MH}$ and $f_{ML}$, and the Bragg cell 62 is driven at the frequency $f_{VCXO}$; they thus shift the frequencies of their input signals by corresponding amounts. The CW component beam emerging from the Bragg cell 61 has the frequency $f_O+f_{MH}$ or $f_O+f_{ML}$, and the CCW component beam emerging from the Bragg cell 62 has the frequency $f_O+f_{VCXO}$.

After emerging from the optical waveguide 7, the CW and CCW component beams pass through the Bragg cells 62 and 61, respectively, to the beam splitter 5, which recombines the two component beams into a single beam. Prior to the combination, the two component beams are again shifted in frequency by the Bragg cells, so their frequencies are $$f_{CW}=f_O+f_{MH}(\text{or } f_{ML})+f_{VCXO}$$

and $$f_{CCW}=f_O+f_{VCXO}+f_{MH}(\text{or } f_{ML}).$$

Thus, the two component beams have the same frequency $f_O+f_{VCXO}+f_{MH}(\text{or } f_{ML})$ when being combined in the beam splitter. The interference signal passes through the single-mode filter 4 and the beam splitter 3 to an optical-to-electrical transducer 8.

The frequencies $f_{MH}$ and $f_{ML}$ are generated by oscillators 146 and 145, which provide signals of constant frequency. A switch 147 transfers either of these two signals as a drive signal to the Bragg cell 61. The switching occurs periodically at the frequency $f_S$. Connected to the oscillators is a mixer 144, which is followed by a filter 143 and a divide-by-2 stage 142. This circuit derives from the signals with the frequencies $f_{MH}$ and $f_{ML}$ a signal with the frequency $$f_M=f_{MH}+f_{ML}/2.$$

The output signal of the optical-to-electrical transducer 8 is preamplified in an amplifier 91 and filtered in a band-pass filter 10. The midfrequency of the filter 10 is adjusted to the switching frequency $f_S$ of the switch 147.

The AC voltage output signal of the band-pass filter 10 is rectified in a rectifier 121, provided with a direction-of-rotation dependent sign in a multiplier 122 (to this end, it is multiplied by a signal whose generation will be explained below), and integrated in an integrator 123. The output signal of the integrator 123 controls the output frequency $f_{VCXO}$ of a voltage-controlled oscillator 124.

The signal applied to the multiplier is generated in a sign detector 11, which contains a limiter 111, an exclusive-OR gate 112, and an integrator 113. The signals applied to the exclusive-OR gate are the output signal of the limiter 111 and the signal with which the switch 147 is operated.

The following description of the operation of the rotation rate measuring instrument assumes that the Bragg cell 2 is continuously driven with the signal of frequency $f_J$, i.e., that the laser is active.

The output of the VCXO 124 is fed to a multiplier 141, whose second input signal is the output signal of the divide-by-2 stage 142, which has the frequency $f_M$. The output signal of the multiplier 141 is fed to a display unit 13.

As the Bragg cell is driven at different frequencies, the light beam obtained by the superposition in the beam splitter 5 is phase-modulated (independent of the direction of rotation).

The frequency difference $\Delta f$ between the CW component beam and the CCW component beam in the closed light path 7 is $f_{VCXO}-f_{MH}$ or $\Delta f = f_{VCXO}-f_{ML}$, depending on the position of the switch 147. As a result of the frequency difference $\Delta f$ between the component beams in the closed light beam 7, a phase difference $\phi_B$ builds up between the CW and CCW component beams which is proportional to the propagation time of the component beams in the closed light path 7 and to the frequency difference. It is given by $$\phi_B = 2\pi \cdot \frac{n \cdot L}{c} \cdot (f_{VCXO} - f_{MH}) \quad (1)$$

or $$\phi_B = 2\pi \cdot \frac{n \cdot L}{c} \cdot (f_{VCXO} - f_{ML}),$$

where n=refractive index, L=length of the closed light path, and c=velocity of light. The subscript B stands for "Bragg cell" and is to bring to mind that the phase difference $\phi_B$ can be arbitrarily varied by means of the Bragg cells 61 and 62.

To explain the method of modulation, it is assumed that the rotation rate measuring instrument is at rest, i.e., that the phase difference caused by the Sagnac effect, $\phi_S$, is zero, and that $f_{VCXO}=f_M=$average frequency of $f_{MH}$ and $f_{ML}$. The switching frequency $f_S$, at which the two frequencies $f_{MH}$ and $f_{ML}$ are alternately applied to the Bragg cell 61, is assumed to be 1 kHz. The frequency difference between $f_{MH}$ and $f_{ML}$ is chosen so that, if switching is effected between these two fixed frequencies, a phase change of $\pi$ is obtained in accordance with equation (1). Since $f_{VCXO}=f_M$ as assumed above, the switching between $f_{MH}$ and $f_{ML}$ means that on the characteristic of the output signal of the optical-to-electrical transducer (intensity as a function of the phase angle between the two component beams), switching occurs between the points $\phi=+\pi/2$ and $\phi=-\pi/2$ at $f_S$.

If the intensity of the output signal of the optical-to-electrical transducer 8 is $I_1$ for $\phi=0$, the periodic switching between $f_{MH}$ and $f_{ML}$ results in a DC voltage signal with the intensity $I_1/2$ at the output of the transducer 8.

In the presence of rotation at the rate $\Omega$, the phase angle is $\phi=\phi_{B1}+\phi_S$ or $\phi=\phi_{B2}+\phi_S$. The switching at $f_S$ thus gives a square-wave signal of frequency $f_S$ whose phase relationship to the switching signal depends on the direction of rotation.

The phase-locked loop containing the preamplifier 91, the band-pass filter 10 with the midfrequency $f_S$, the sign detector 11, the rectifier 121, the integrator 123, and the VCXO 124 is designed so that the VCXO 124 is adjusted until the AC voltage signal at the output of the band-pass filter 10 disappears. When this condition is reached, the reciprocal phase difference produced by means of the Bragg cell 61, $$\phi_B = 2\pi \cdot n \cdot L/c \cdot (f_{VCXO}-f_M),$$

compensates for the rotation-induced Sagnac phase difference $$\phi_S = \frac{4\pi \cdot L \cdot R}{\lambda_o \cdot c} \cdot \Omega.$$

It follows that $$\Omega = \frac{n \cdot \lambda_o (f_{VCXO} - f_M)}{2R}$$

where R is the radius of a winding of the coiled optical waveguide. Thus, the frequency difference $f_{VCXO}-f_M$ is directly proportional to the rotation rate $\Omega$. A signal of this frequency is present at the output of the mixer 141. This signal is fed to the display unit 13.

Measurements with an instrument as described so far show that for $\Omega=0$ and, hence, $\phi_S=0$, a frequency difference $(f_{VCXO}-f_M)$ can already be observed which drifts with temperature. This points to a nonreciprocal "interference phase" $\phi_{NR}$, which is superimposed on the nonreciprocal "measurement phase" $\phi_S$. By means of $\phi_B$, therefore, the phased-looked loop compensates not only for $\phi_S$ but for $\phi_S+\phi_{NR}$.

One of the causes of the interference phase is that during the implementation of the instrument, it cannot be ensured that the optical lengths between the two Bragg cells 61, 62 and the beam splitter 5 always have exactly the same value. As a result, the construction, which should be reciprocal with respect to the paths for the two component beams, becomes a "slightly" nonreciprocal construction. Besides this disturbance, there are other influences which cause the construction to become nonreciprocal.

The following explains, with the aid of the drawing, what steps are taken in the novel instrument to detect the nonreciprocal interference phase $\phi_{NR}$, so that it can be taken into account during evaluation.

Via an additional passive beam splitter 16, an additional coiled optical waveguide 17 is connected to the coiled optical waveguide 7. The additional beam splitter 16 splits each component beam into two further component beams one half of which remains in the optical waveguide 7, and the other half is coupled into the additional waveguide 17 in such a way that the component beams produced by the additional beam splitter propagate in the two optical waveguides in opposite directions. For instance, one half of a component beam propagates in the first optical waveguide 7 clockwise, and the other half propagates in the additional optical waveguide 17 counterclockwise. Thus, if, in the presence of rotation, the Sagnac phase difference between the component beams emerging from the first optical waveguide 7 is $+\phi_S$, the corresponding Sagnac phase difference for the additional optical waveguide 17 is $-\phi_S$.

The additional passive beam splitter 16 produces no additional nonreciprocal phase difference.

A clock generator (not shown) provides a square-wave clock signal of frequency $f_{SL}$. This clock signal controls the switch 15, so that the Bragg cell 2 passes and blocks the laser light beam alternately. The time $\tau_{ON}$, during which the laser is active, is adjusted to the propagation time of the component beams in the closed light path implemented with the optical waveguide 7. Thus, $$\tau_{ON} = n \cdot L / c.$$

The times during which the laser is inactive are $$\tau_{OFF} = 2\tau_{ON}.$$

The combination of the CW and CCW component beams, which traverse the first optical waveguide 7, takes place during the first half of $\tau_{OFF}$. A phase difference of $$\phi = \phi_{NR} + \phi_S$$

exists between the component beams.

The combination of the CW' and CCW' component beams, which travel around the additional optical waveguide 17, takes place during the second half of $\tau_{OFF}$. A phase difference of $$\phi' = \phi_{NR} + \phi_S - \phi'_S$$

exists between these two component beams.

$$\left( \phi_S = \frac{4\pi L \cdot R}{\lambda_o \cdot c} \Omega; \ \phi'_S = \frac{4\pi L' \cdot R'}{\lambda_o \cdot c} \Omega \right).$$

In the embodiment shown in the drawing, the amplifier 91 is connected to the band-pass filter 10 via a switch 92. An additional band-pass filter 10' is provided, which, like the band-pass filter 10, is followed by a sign detector 11' and a rectifier 121', a multiplier 122', an integrator 123', and a VCXO 124'. The amplifier is connected to the band-pass filter 10' via a switch 93. Both switches 92, 93 are controlled by the clock signal, which has the frequency $f_{SL}$. The two switches 92 and 93, of which only one is closed at a time, act as sample-and-hold elements. The control signals of frequency $f_{SL}$ for the two switches are separated in time by $\tau_{OFF}/2$. By this control, the signals differing in phase by $\phi$ and $\phi'$ are separated from each other in time.

In addition to the output signal of the VCXO 124, having the frequency $f_{VCXO}$, the output signal of the VCXO 124', having the frequency $f'_{VCXO}$, is used to drive the Bragg cell 62. A switch 18 is controlled by a signal of frequency $f_{SL}/2$, which is derived from the signal of frequency $f_{SL}$.

What was said about the control of the VCXO 124 applies analogously to the control of the VCXO 124'. The latter thus compensates for $\phi' = \phi_{NR} + \phi_S - \phi'_S$. In the steady state, therefore, $$\phi = \phi_{NR} + \frac{4\pi R \cdot L}{\lambda_o \cdot c} \Omega + \frac{2\pi n \cdot L}{c} (f_{VCXO} - f_M) = 0 \quad (2)$$

and $$\phi' = \phi_{NR} + \frac{4\pi R \cdot L}{\lambda_o \cdot c} \Omega - \frac{4\pi R' L'}{\lambda_o \cdot c} \Omega + \quad (3)$$

-continued
$$\frac{2\pi n (L + L')}{c} (f'_{VCXO} - f_M) = 0.$$

The first equation (2) relates to the evaluation of the signals of the first time interval of $\tau_{OFF}$, and equation (3) to the evaluation of the second interval of $\tau_{OFF}$.

The output of the VCXO 124' is also fed to an additional mixer 140, whose second input signal is the output signal of the divide-by-two stage 142. The output of the mixer 140 is fed through a multiplier 148 (multiplication by a factor of 2) to the evaluation unit 13.

The mixers 140 and 141 form signals with the two frequency differences $f_{VCXO} - f_M = \Delta f$ and $f'_{VCXO} - f_M = \Delta f'$, respectively.

If certain requirements are fulfilled, it is possible to calculate in the evaluation unit from the frequency difference $\Delta f'$ of the second measurement back to the additional phase difference stemming from $\phi_{NR}$ during the first measurement. This will now be explained in more detail.

It is assumed that $\phi_{NR}$ is the same for both light paths L and L+L'. This requirement is satisfied in the case described above. In addition, it is required that in the second measurement, $\phi_S = \phi'_S$. Only then can a rotation-rate-dependent measurement of $\phi_{NR}$ be performed. The accuracy with which the interference phase $\phi_{NR}$ can be determined is dependent on the agreement between the products $L \cdot R$ and $L' \cdot R'$. Because of $\phi_S - \phi'_S \sim \Omega$, however, any error in the determination of $\phi_{NR}$ is also dependent on the instantaneous rotation rate $\Omega$.

With a double-wound optical-waveguide coil, agreement between LR and L'·R' can be achieved to an accuracy of $10^{-4}$.

A logic circuit in the evaluation unit takes the finite agreement between $\phi_S$ and $\phi'_S$ into account by causing a measurement of $\phi_{NR}$ to be performed only if the measured value for $\Omega$ from $\phi_{NR} + \phi_S$ does not exceed a predetermined threshold value. If the threshold is exceeded, the calculation continues with the previous measured value $\phi_{NR}$.

Example: Threshold $\phi_{NR} + \phi_S$ lies at $10^{-1}$ degrees; this corresponds to $\Omega = 100°/h$. With $\phi_S - \phi'_S \leq 10^{-4}\phi_S$, the nonreciprocal interference phase can then be determined to within $10^{-5}$ degrees; this corresponds to an error of $0.01°/h$.

To show how it is possible to calculate from $\Delta f'$ back to the component originating from $\phi_{NR}$ in $\Delta f$, it will be assumed for simplicity that $\Omega = 0$. The case $\Omega \neq 0$ will be described thereafter.

For $\Omega = 0$, it follows from equations (2) and (3) that $$\phi_{NR} + \frac{2\pi n \cdot L}{c} \cdot \Delta f = 0$$

and $$\phi_{NR} + \frac{2\pi n (L + L')}{c} \cdot \Delta f' = 0.$$

If $\phi_{NR}$ is constant, and $\Delta f'$ has been measured, and with L and L' known, $\Delta f$ is given by $$\Delta f = L + L'/L \cdot \Delta f'.$$

The case is especially simple if $L = L'$; then, $$\Delta f = 2\Delta f'.$$

If $\Omega \neq 0$, the measured quantity $\Delta f$ can be decomposed into two components, namely into a $\Delta f(\Omega)$ and a $\Delta f(\phi_{NR})$. Since $\phi_{NR}$ is independent of $\Omega$, the component $\Delta f(\phi_{NR})$ is the same as for the case $\Omega = 0$ and can be taken from the second measurement (as before), because the second measurement is independent of $\Omega$ except for the negligible error $\phi_S - \phi_S'$.

The case $L = L'$ is especially easy to realize in practice. The two coils are wound simultaneously, and the condition $\Delta f(\phi_{NR}) = 2 \cdot \Delta f'$ for $L = L'$ is satisfied by doubling the frequency $\Delta f' = f'_{VCXO} - f_M$ in the multiplier 148 ahead of the evaluation and display unit.

We claim:

1. A rotation rate instrument comprising:
    a light source;
    means for shifting the frequency of a light beam from said source;
    a first beam splitter which functions to divide said light beam from said light source into two component beams;
    a first closed light path which is traversed by one of said two component beams leaving said first beam splitter in a clockwise direction and the other of said two component beams leaving said first beam splitter in a counterclockwise direction;
    a second beam splitter which functions to divide each of said two component beams into two further component beams one of which remains in said first closed light path;
    a second closed light path which is traversed by each of the other of said further component beams, one of said each of the other of said two further component beams traversing said second closed light path in a clockwise direction and the other of said each of said two further component beams traversing said second closed light path in a counterclockwise direction;
    an optical to electrical transducer connected to an output of said first beam splitter so as to receive said two component beams and said two further component beams after the beams have been recombined in said first beam splitter; and
    means connected to the output of said optical to electrical transducer and functioning to measure, at different times, the phase difference between component beams which have traversed only said first closed light path and the phase difference between component beams which have traversed both said first and second closed light paths.

2. An instrument as claimed in claim 1, wherein the second closed light path has the same optical length as the first closed light path.

3. An instrument as claimed in claim 1, wherein each of the closed light paths is implemented with an optical waveguide.

4. An instrument as claimed in claim 3, wherein each of the optical waveguides is coiled, and the windings of the coils have the same radius.

5. An instrument as claimed in claim 4, wherein each of the optical waveguides is wound as a bifilar winding on one coil form.

6. An instrument as claimed in claim 2, wherein each of the closed light paths is implemented with an optical waveguide.

7. A method for measuring rotation rate comprising the steps of:
    generating a light beam;
    shifting the frequency of said light beam on a periodic basis;
    splitting said light beam into two component beams;
    conveying each of said two component beams through a first closed light path, one of said two component beams traversing said first closed light path in a clockwise direction and the other of said two component beams traversing said closed light path in a counterclockwise direction;
    splitting each of said two component beams into two further component beams, one of which remains in said first closed light path and the other of which traverses a second closed light path; and
    measuring, at different times, the phase difference between component beams traversing only said first light path and the phase difference of component beams traversing said first and second closed light paths.

8. The method of claim 7 wherein said frequency of said light beam is shifted by combining it with a signal having a given period and combining said signal with the light beam during the first third of said given period and wherein said phase difference of component beams traversing only said first light path is measured during the second third of said given period and said phase difference of component beams traversing said first and second closed light paths is measured during the last third of said given period.

* * * * *